Patented Mar. 15, 1938

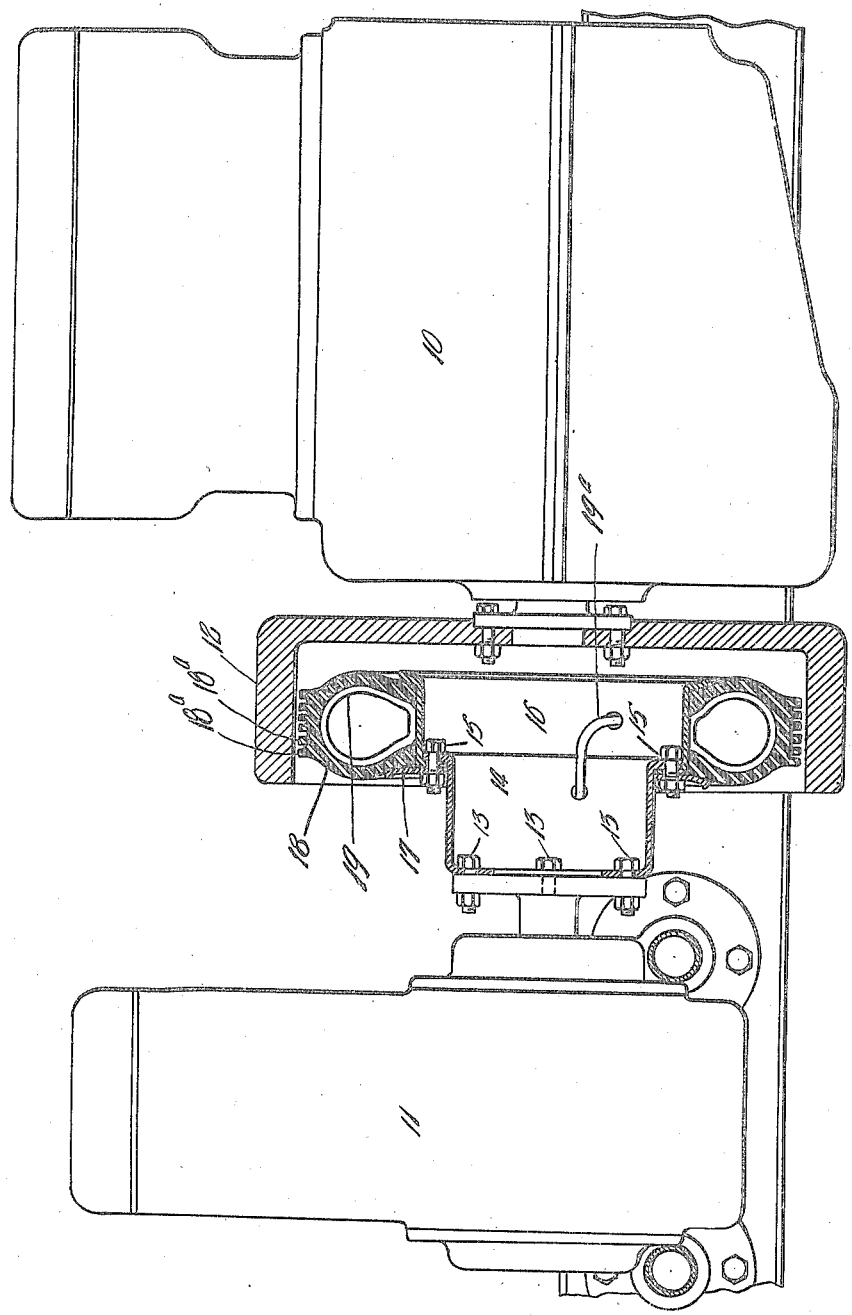

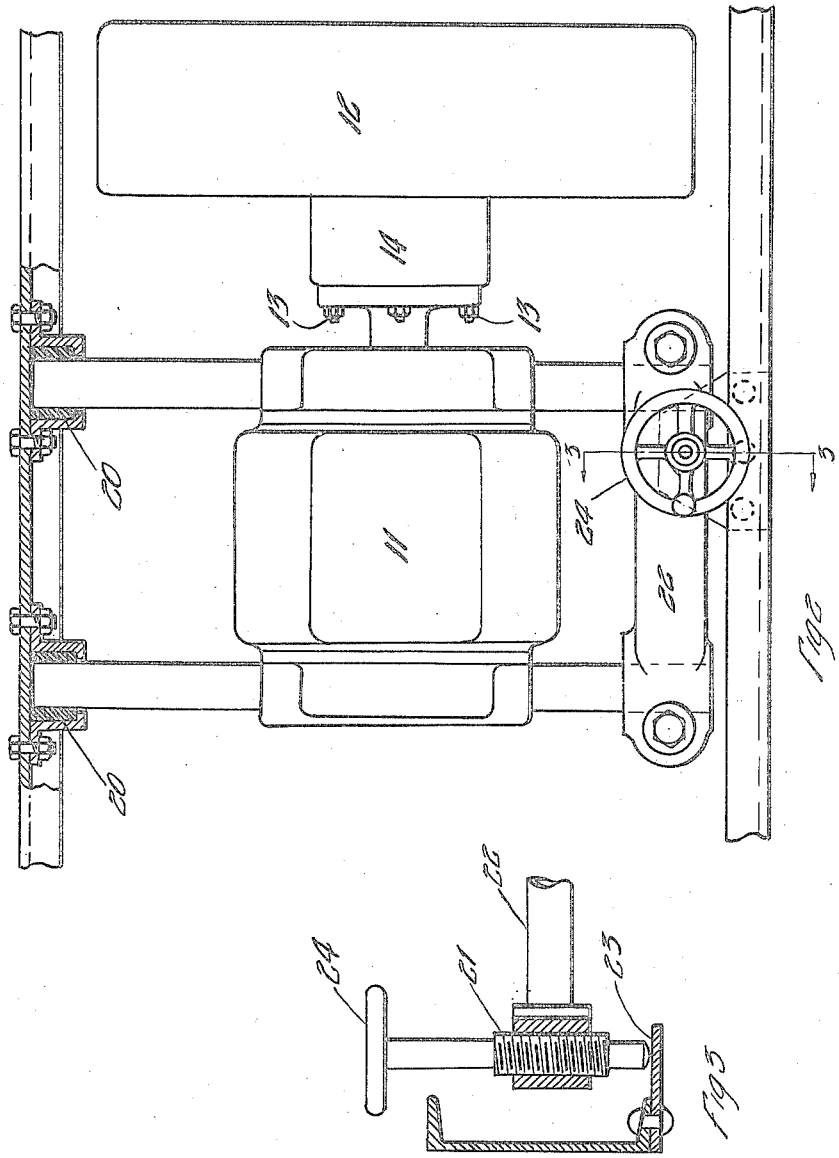

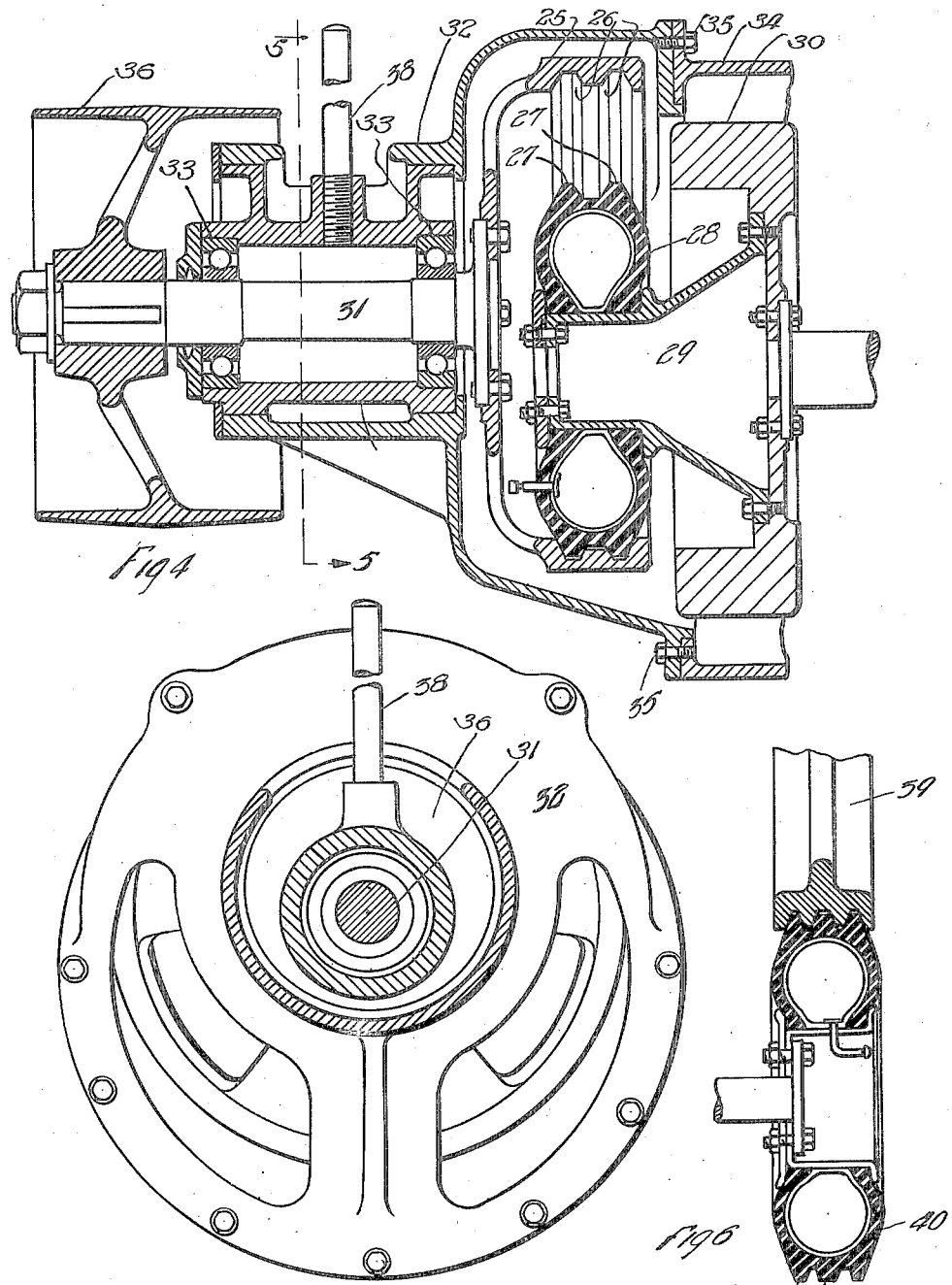

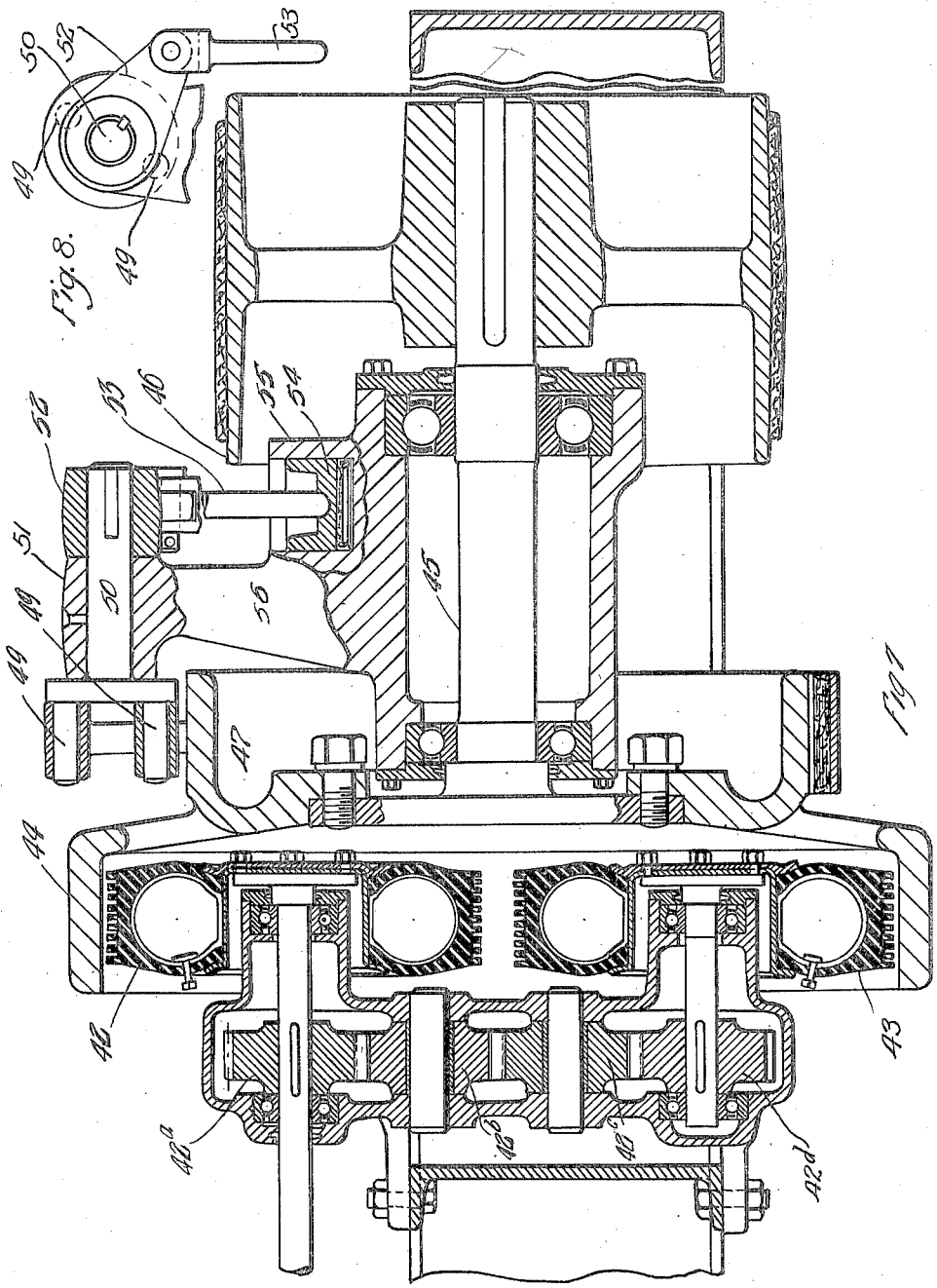

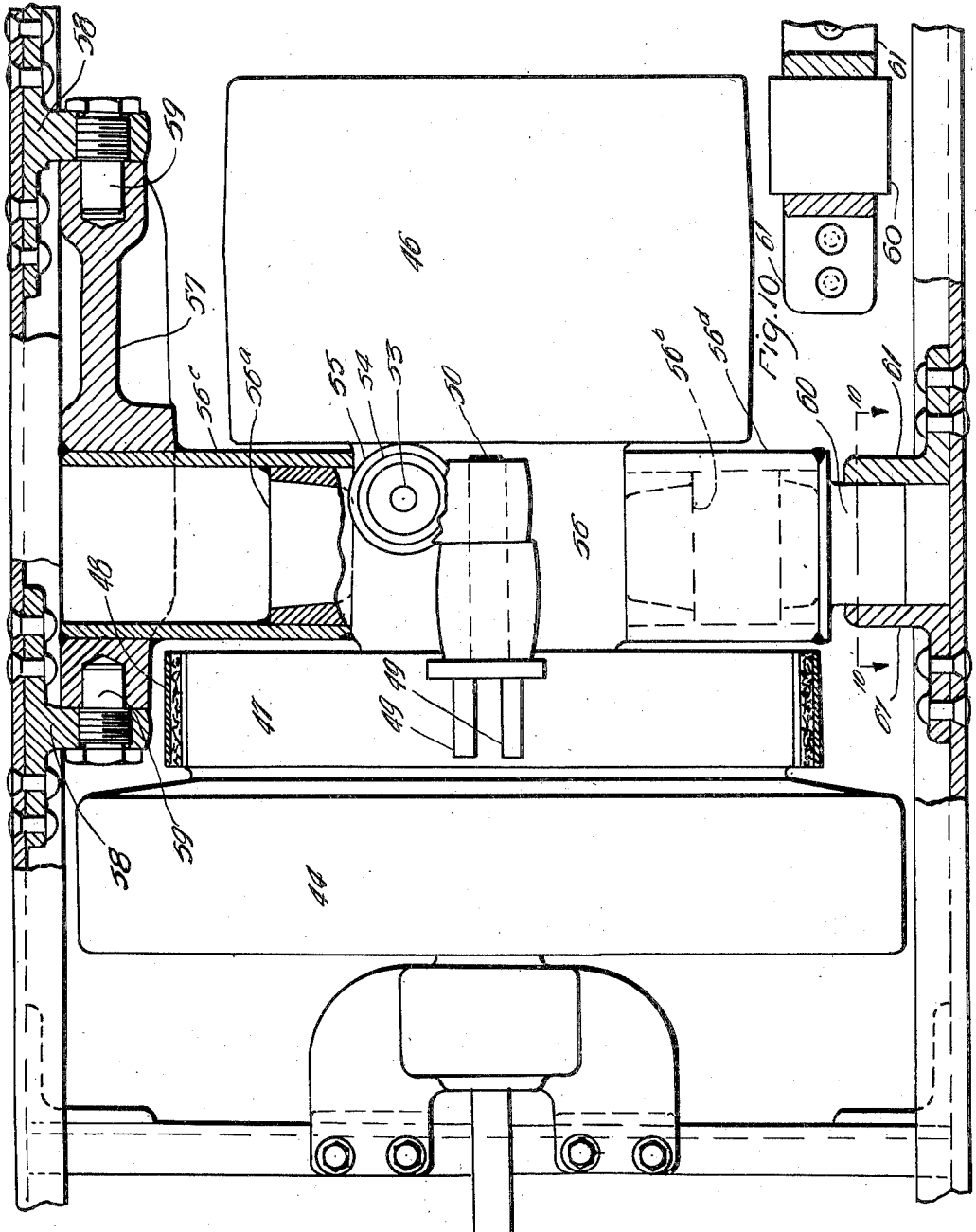

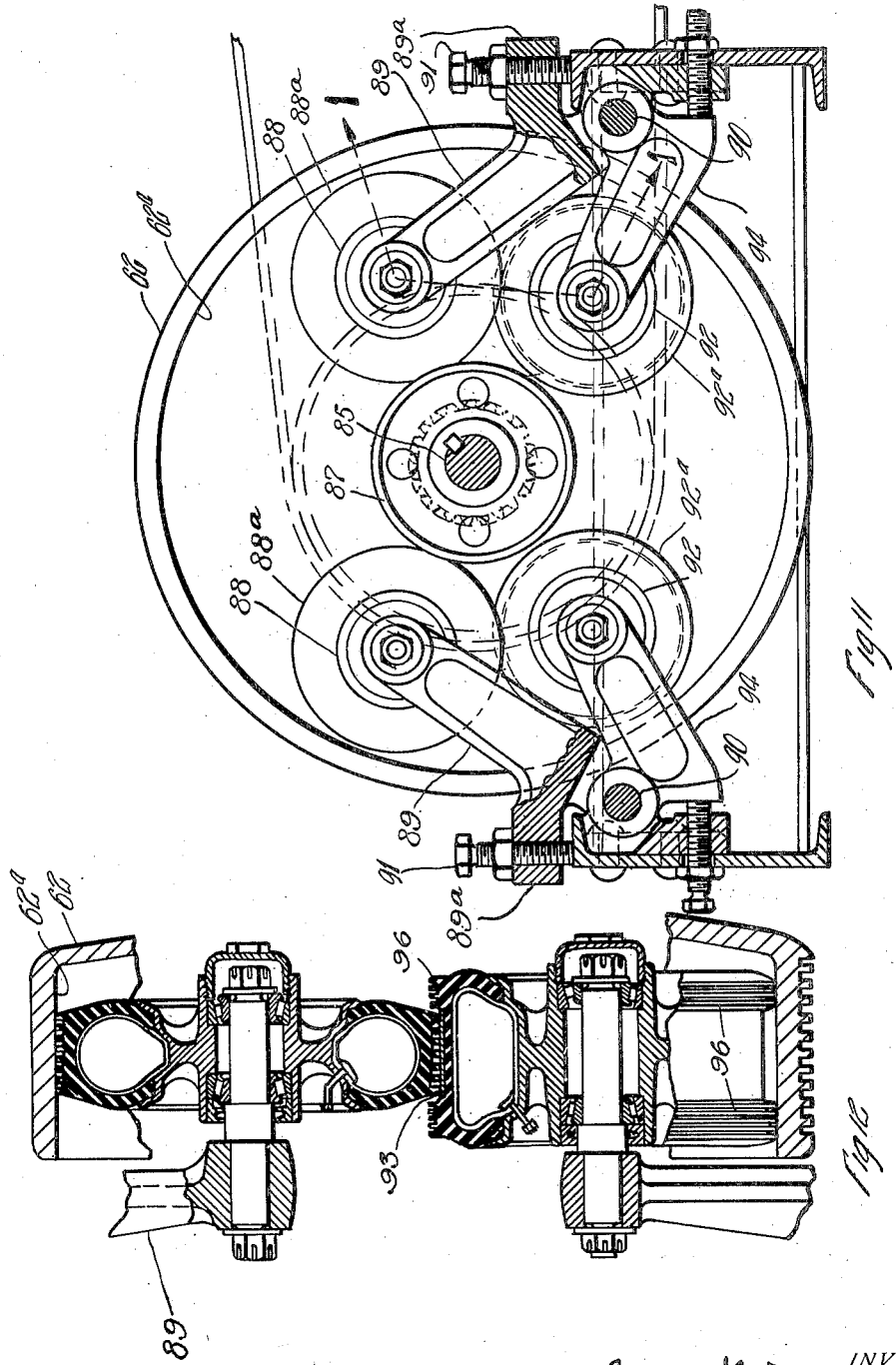

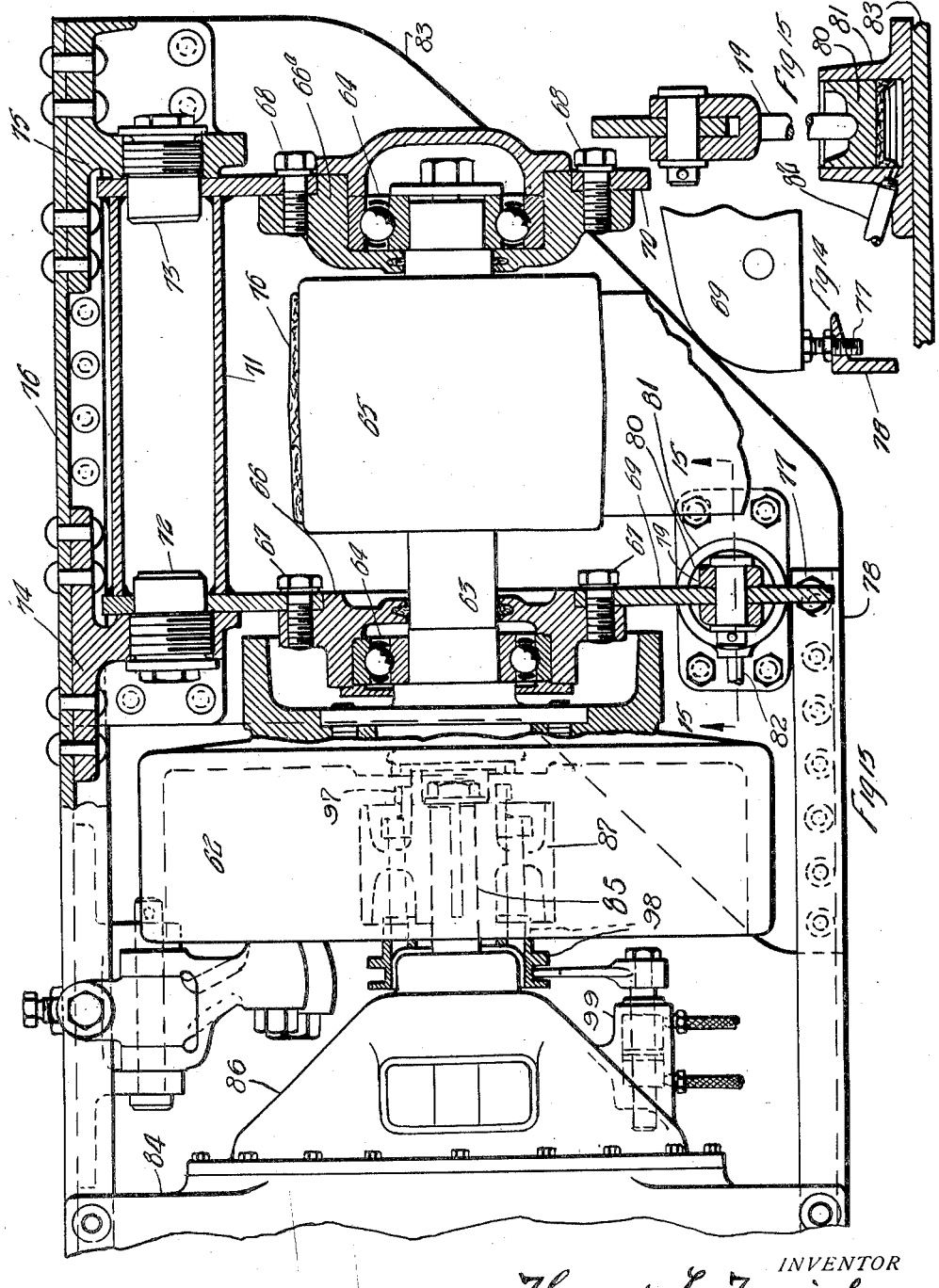

2,111,422

UNITED STATES PATENT OFFICE 2,111,422

ASSEMBLY FOR DRIVING CLUTCHES AND THE LIKE

Thomas L. Fawick, Akron, Ohio

Application September 4, 1936, Serial No. 99,420

9 Claims. (Cl. 74—190)

This invention relates to assemblies suitable for use as driving clutches and universal joints or flexible shaft-couplings, brakes and the like.

Its chief objects are to provide:

Economy of manufacture; durability; effective cushioning action; quiet operation; ease and economy in the replacement of parts; avoidance of slippage and wear; avoidance of the problem of lubrication; economy of power; simplicity of construction; avoidance of the necessity of close alignment of the driving and driven members; strong and dependable driving connection; ease and simplicity of engaging and disengaging in the case of a driving clutch mechanism and of assembly and disassembly in the case of such a mechanism or that of a universal joint; a clutch mechanism having provision within itself for giving a fractional drive ratio; and by substitution of differently dimensioned parts, a readily available and wide range of drive ratios.

Of the accompanying drawings:

Fig. 1 is a side elevation of a motor and an air compressor and a drive connection between them including a clutch assembly embodying my invention in one of its simpler forms, parts of the said assembly being shown in section.

Fig. 2 is a plan view of parts of the same, with parts shown in section.

Fig. 3 is a vertical section on line 3—3 of Fig. 2.

Fig. 4 is a vertical, longitudinal section of parts of a stationary and portable industrial power unit illustrating another embodiment of my invention.

Fig. 5 is a section on line 5—5 of Fig. 4.

Fig. 6 is a fragmentary sectional view showing one feature of my invention as applied to an "outside" drive.

Fig. 7 is a vertical, longitudinal section of another embodiment of my invention adapted to provide conveniently for reversal of drive.

Fig. 8 is an elevation of parts of a brake-actuating mechanism.

Fig. 9 is a plan view of the assembly of Fig. 7, parts being sectioned and broken away.

Fig. 10 is a section on line 10—10 of Fig. 9.

Fig. 11 is a transverse section, on line 11—11 of Fig. 13, of an embodiment of my invention especially adapted for heavy duty.

Fig. 12 is a section on line 12—12 of Fig. 11.

Fig. 13 is a vertical longitudinal section of parts of the mechanism of Figs. 11 and 12, other parts being shown in elevation.

Fig. 14 is a fragmentary view of a part of a hinged structure shown in Fig. 13 and means for limiting its downward movement.

Fig. 15 is a section on line 15—15 of Fig. 13, with a part broken out to shorten the vertical length of the figure.

Referring first to Figs. 1 and 2 of the accompanying drawings, the motor, shown diagrammatically as an engine of the internal combustion type, is designated 10, and 11 is an air compressor either accurately or only roughly aligned for driving connection with the shaft of the motor.

The motor shaft has secured thereon a bell-shaped clutch member 12, preferably a casting, which may constitute the fly-wheel of the motor, having its open end facing the compressor.

Detachably mounted on the shaft of the compressor by means of bolts 13, 13 is a bell-shaped hub member 14, preferably a stamping, which extends into the interior of the bell and there has secured to it by means of bolts 15, 15 a tire-rim member 16 and a tire-retaining ring 17 therefor.

Mounted on the tire-rim member 16 is a pneumatic tire 18 with its inner tube 19, the tire being of standard construction but preferably formed with high and narrow longitudinal ribs 18a, 18a on its tread, for quiet operation and for strong frictional driving contact with the inner surface of the bell member 12.

For bringing the tire 19 into driving engagement with the said surface provision preferably is made for raising or lowering the compressor with relation to the motor and for that purpose, and for cushioning purposes, the compressor as here shown is mounted at one side upon insulating rubber bushings 20, 20 and at the other upon a set screw 21 having threaded relation to a bracket 22 extending from the casing of the compressor, the lower end of the screw bearing upon a bracket 23 stationarily mounted upon the framing from which the compressor is supported, and the screw being provided at its upper end with a hand-grip 24.

In the operation of this embodiment of the invention, the motor being permissibly, but not necessarily, started before engagement of the clutch, the screw 21 is rotated to raise the bracket 22 and with it the compressor, the compressor hinging on an axis in the region of the rubber bushings 20, until the tire 18 engages the upper portion of the internal face of the bell member 12 with strong, non-slipping, driving contact, the resilient deformability of the pneumatic tire permitting wide adjustment of the set-screw 21 without rapid increase of the pressure of the tire against the bell, and also causing the tire to accommodate itself to irregularities of form or of finish in the bell. Thus the clutch is engaged for the driving of the compressor by the motor, with, in the case of the relative dimensions here shown, a drive ratio of about, but not exactly, one-to-one.

For disengaging the clutch, the screw 21 is of course simply turned in the opposite direction to lower the compressor until the tire is out of contact with the bell.

In this assembly, the tread diameter of the tire being almost as great as the internal diameter of the bell and the drive ratio accordingly being close to one-to-one, the travel of the tire by rolling contact, on the inner face of the drum is very slow, so that frictional wear of the tire from that cause is so extremely small as to be negligible, and the longitudinal ribs 18ª on the tread of the tire, although high and narrow, are not so rapidly flexed as to generate a high degree of heat or quickly break down. Also throughout a wide range of misalignment of the driving and driven shafts the relative weaving movement of adjacent parts of the tire-rim and the bell, transversely of the tire, is permitted by resilient deformation of the tire, without slippage, so that substantially the only friction is the internal friction within the material of the tire, and consequently there is economy of power and avoidance of rapid deterioration of the tire and no parts requiring lubrication, or any part other than the clutch members, is needed for taking care of misalignment of the shafts.

The rotating metal bell, being a good heat conductor, is effective for dissipating heat generated in the tire, especially as the rotation of the bell and tire assembly provide a rotary blower effect for ventilation.

As the tire has a large arc of contact with the bell, a strong driving engagement is effected without very high air pressure within the tire, the total tread pressure increasing almost directly with the spread of contact area.

When the contact area is in the upper region of the bell, as herein described, the driving or tread pressure relieves the adjacent motor bearing of a part or of all of the weight of the fly-wheel bell, transferring it to the adjacent bearing of the compressor shaft, which can be of a construction better adapted to withstand it.

In the construction here shown a damaged tire can readily be replaced by a new one, without moving the motor or the compressor, by the simple operation of removing the bolts, 13 and 15, moving the hub member 14 to the right and the tire and rim to the left as viewed in Fig. 1, until the tire and rim are clear of both the bell and the hub member, lifting the tire and rim out transversely of the shafts for the substitution of a new tire, and then reversing the operation to reassemble the parts with the new tire in place.

Provision may be made, as by the use of a flexible inflating tube 19ª, for inflating or deflating the tire while it is in operating position.

The driving connection described is of especial value for connecting the shaft of an impeller, such as that of the air compressor here shown, with a motor, because of the desirability of close-coupling them and the difficulty of readily obtaining sufficiently close accuracy of shaft alignment when they are close-coupled and other clutch and universal-joint devices are used.

Figs. 4 and 5 show an embodiment of the invention adapted to provide either a stationary or a portable industrial power unit having, among others, the advantages set out in the above statement of objects.

In the embodiment shown in these views the bell-shaped member 25, is shown as the driven member of a speed-reducing clutch assembly, and it is formed internally with longitudinal V-type or trapezoidal grooves 26, 26 adapted to receive in driving relation trapezoidal longitudinal ribs 27, 27 formed on the tread portion of a tire-like bag 28 which is mounted on an extension bracket 29 secured coaxially to the fly-wheel 30 of the motor, the tire being shown as having a much smaller tread diameter than the internal diameter of the bell 25, to provide a substantial speed reduction. The grooves 26 are of such depth in relation to their truncated shape and that of the ribs 27 of the tire as to permit the ribs to seat in them by a wedging action, to give strong frictional driving engagement.

For compactness and for portability of the entire assembly as a unit, the bell 25 and its shaft 31 are mounted in a hollow bracket 32 secured to the case 34 of the motor by cap-screws 35, 35 and a drive member, which can be any of the usual rotary drive members, such as the belt-wheel 36 here shown, is mounted upon the end portion of the shaft 31 beyond the bearings 33, 33 for the shaft.

To provide for raising and lowering the shaft 31 to engage the tire 28 with the bell 25 and disengage it therefrom the bearings 33 are mounted in a bushing 37 which is eccentric with relation to the shaft 31 and is rotatably mounted in an extension of the hollow bracket 32 and provided with a turning handle 38.

When the eccentricity of the bushing and shaft is small in degree and its outer diameter is quite large, as shown in Fig. 5, where the shaft is shown as being in its lowermost or de-clutching position, no means other than the friction of the bushing in its bearing is necessary for holding the bushing to any position to which it is turned.

The eccentricity being small, as stated, the turning of the bushing in one direction or the other does not greatly tighten or loosen a belt of substantial length mounted upon the pulley 36, and for raising the bell 25 into driving engagement with the tire 28 the bushing's handle may be turned to a position (to the right as viewed in Fig. 5, which is toward the observer as it is viewed in Fig. 4) such that the tension of the belt will help the friction of the bushing to hold the clutch members engaged.

In the modification shown in Fig. 6, the V or side-driving principle is shown as applied to an external drive comprising a wheel or pulley 39 having the grooves in its outer surface and a tire 40 having truncated or trapezoidal ribs 41, 41ª on its tread for engaging in the grooves. The middle rib and the middle groove are here shown as being wider than those at each side, for transmitting a large part of the torque at the middle position, where the tire is likely to bear heaviest against the wheel, but the size, shape and number of the grooves and ribs of course can be varied.

The groove and rib feature, while advantageous in an "outside" drive such as that of Fig. 6, is especially well adapted for the "inside" type of drive, illustrated in Fig. 4, because the travel of the bag or tire member on the inner surface of the bell member is so slow, as compared with the corresponding travel in the outside drive of Fig. 6, that but little wear results from the movement of the rib into and out of the groove.

Figs. 7 and 8 show an embodiment adapted for convenient reversal of drive, two tire-like bags, 42, 43, being employed, one being adapted to contact the inner surface of the bell in its upper region and the other in its lower region, and the shafts on which the tires are mounted being connected by a train of gearing consisting of an even number of gears, here shown as four, 42a, 42b, 42c, 42d, to give the desired change of the direction of drive when the bell member, 44, with its shaft 45, is raised or lowered.

For quick stopping of the belt wheel 46 and associated parts, as for reversal of drive, for example, a brake-drum 47 is provided on the bell member 44, with a brake band 48 having its ends hinged on actuating pins 49, 49 projecting from a head formed on a rock-shaft 50 which is mounted in a bearing bracket 51 formed on the casting in which the driven shaft 45 is mounted, the rock-shaft 50 having actuating connection through a rocking arm 52 (see Fig. 8) and a push-link 53 with a piston 54 mounted in a pressure fluid cylinder 55 formed on the casting and provided with means (not shown) for charging and venting it.

For raising and lowering of the driven assembly which includes the bell 44 and its shaft 45 to make and break clutch engagement of the bell with the tire 42 or the tire 43 selectively, the casting or shaft-housing 56 supporting the driven assembly is at one side rigidly connected to a casting 57 (Fig. 9) which is hinged between brackets 58, 58 on the framing by pintle screws 59, 59, and at the other side the housing has rigidly connected to it a square guiding and supporting member 60 which is mounted for sliding vertical movement between a pair of angle-iron guides 61, 61 secured to the framing, and is provided with any suitable means (not shown) for raising it and lowering it.

For economy and strength of construction the shaft-housing 56 is formed at opposite sides (Fig. 9) with trunnion-like hollow projections 56a, 56b, which have shrunk upon and welded to them respective pieces of heavy pipe, 56c, 56d which have shrunk on and welded connection respectively with the casting 57 and the supporting and guiding member 60.

Figs. 11, 12 and 13 show an embodiment of the invention especially adapted for heavy duty such as that of oil-well drilling equipment, with convenient provision for suitable drive ratios for the respective heavy and light jobs of pulling out and letting in tools, and providing also compactness, simplicity and economy of construction.

In this embodiment a bell-shaped member 62 having a cylindrical inner drive surface 62a is secured upon a shaft 63 journaled in bearings 64, 64 which are provided with highly rigid means for holding them very accurately in alignment although an assembly of which they are a part is mounted for hinged vertical adjustment and although in service the belt pulley 65 (mounted upon the shaft 63 between the bearings for desirable distribution of the bearing load between them and for avoidance of bending strain in the shaft) is subjected to an extremely high tensioning of the belt.

To provide such rigidity the bearings 64 are mounted in housing structures 66, 66a which are firmly and accurately held, by cap screws 67, 67, 68, 68, in apertures formed in respective armpieces 69, 70 of strong sheet metal such as boilerplate, and these two hinge arms are welded at their hinge ends to opposite ends of a large and strong length of pipe 71.

At the hinge axis, within the limits of the cross-section of the pipe 71, each of the arm members is formed with a hole which not only permits interior welding of the pipe to the arm but also serves as a bearing aperture for a pintle plug, 72 or 73, the pintle plugs having threaded engagement in respective brackets 74, 75 which are accurately fitted and riveted to a channel iron 76 which is a part of the frame of the machine.

For compactness and for good clearance for the belt, 76, the arm 70 is shorter than the arm 69, only the latter being extended to provide for its serving as the lever for lifting and lowering the hinged assembly of which it is a part.

To limit downward movement of the assembly, and on occasion to support it at an intermediate, shaft-aligning position, an adjusting screw 77 (Fig. 14) is threaded through the upper flange of a channel iron 78 which is a part of the frame of the machine, the head of the screw bearing against the lower edge face of the arm member 69.

For raising and lowering the hinged assembly the outer end portion of the arm 69 has a push-link 79 interposed between it and the piston 80 of a pressure-fluid cylinder 81 having a charging and venting pipe 82, the cylinder being mounted upon a strong piece 83 of sheet metal such as boiler plate which connects the channel irons 76 and 78 and brackets 74, 75 and provides great rigidity and strength and also serves as a skid when the apparatus is violently dragged about over rough ground.

For compactness and for good clearance for the belt the base plate 83 terminates in an oblique edge in its near, right-hand portion and the near channel iron, 78, is correspondingly short. The opposite edge of the base plate 83 also is oblique in a part of its length, for clearance of the lowermost portion of the bell member 62.

The motor, 84 (Fig. 13), which may have the usual clutch interposed between its crank shaft and a drive shaft 85 extending from its end-housing 86, is secured to the channel irons 76, 78 of the assembly just described.

For driving the bell member 62 in the direction opposite to that of the motor shaft 85, counter-clockwise as viewed in Fig. 11, a cylindrical pulley 87 is secured upon the shaft 85 and is adapted to transmit torque to the bell 62 through idler wheels 88, 88, having pneumatic tires 88a, 88a, thereon, when the bell 62 is lowered so as to impose upon the idlers some or all of its weight and that of the hinged assembly of which it is a part.

The idlers 88 are journaled on the ends of respective arms 89, 89 each having a forked hub end hinged at 90 upon a part of the frame of the machine and provided with a lateral or rearward extension 89a having a set screw 91 threaded through it and bearing against a frame part to hold the idlers at all times against the pulley 87 with sufficient force to provide for driving the bell 62 in the other direction through the idlers 88, 88 and a second pair of idlers, 92, 92 having pneumatic tires 92a, 92a thereon. The idlers 92 are journaled on the ends of respective arms 94, 94 which have forked hub ends hinged on the machine frame at 90, each being formed with a lateral extension or heel adapted to limit downward movement of the arm by bearing against a set-screw 95 threaded through a frame part, the set screws preferably being adjusted to positions such that they hold the idlers 92 close to but just out of contact with the idlers 88, the construction being such that when it is raised the bell 62 contacts the lower idlers 92 and raises them into contact with the idlers 88 and then imposes sufficient pressure in both contacts to provide non-slipping driving engagement as the bell is further raised to put the pneumatic tires under compression.

Preferably each of the second pair of idlers, 92, has on its middle tread region a metal band 93 adapted to have driving engagement with the tread of the adjacent idler tire 88ᵘ and, on each side of the metal band, a rubber tread 96 adapted to have the driving engagement against the inner face of the bell 62.

For driving the bell 62 and its shaft 63 in the same direction and at the same speed with the shaft 85, a clutch mechanism 97 is interposed between the two shafts and provided with a shipper lever 98 and a two-way actuating cylinder 99.

In heavy transmissions such as the one described it is desirable, although not essential, that the driving engagement of the bell and idlers be made while the drive shaft 85 is not revolving rapidly, the usual clutch constituting a part of the motor assembly being disengaged.

When it is desired to engage the clutch 97 for direct drive the bell 62, with the hinged assembly of which it is a part, is set, by adjustment of the screw 77 (Fig. 14), at a position such that the shafts 85 and 63 are aligned, the bell 62 then being out of contact with the idlers of both pairs and the idlers 92 being out of contact with the idlers 88.

It will be clear from the foregoing that this embodiment of the invention provides a strong, compact, simple drive having two speeds in one direction and one in the other, with ease and quickness of changing speed or direction of drive, and that the construction and arrangement is admirably suited for heavy drives such as are required in oil-well drilling equipment.

While this mechanism has been here described as adapted to be driven by a single motor, the invention is not wholly limited to a one-motor drive.

An advantage of the construction shown and described is that in an installation in which a sympathetic vibration occurs or is likely to occur it can be stopped or avoided by stiffening or softening the bag by increasing or decreasing the fluid-pressure within it and thus changing the natural rate of vibration or harmonics of the assembly.

I claim:

1. The combination of an industrial service mechanism to be driven, a pair of transmission shafts in series for driving the same, and, rigidly mounted upon the shafts respectively, a driving member and a driven member, one within the other, the two having juxtaposed and at least substantially annular surfaces, and, directly embraced by the two said surfaces, a fluid-container having flexible, torque-transmitting sidewalls, the container having a drive face urged against the surface of one of the said members directly by the pressure of fluid within the container and being so mounted that said sidewalls are unconfined and freely-flexing in service.

2. The combination of an industrial service mechanism to be driven, a pair of transmission shafts in series for driving the same, and, rigidly mounted upon the shafts respectively, a driving member and a driven member, one within the other, and, directly embraced by at least substantially annular surfaces of the two, a fluid-container having flexible, torque-transmitting sidewalls, the container having a drive face urged against a drive surface of one of the first said members primarily by the pressure of fluid within the container and being so mounted that said sidewalls are unconfined and freely-flexing in service, the combination including means for making and breaking the drive contact of the container.

3. A combination as defined in claim 1 in which the construction and arrangement is such that the container transmits torque solely by friction of at least one of its peripheries.

4. The combination of an industrial service mechanism to be driven and, for driving the same, a pair of transmission shafts in series, a drive member and a driven member mounted upon the shafts respectively, one of the same being formed with an inwardly-facing and at least substantially annular surface surrounding a part of the other member and therewith defining an annular space, a fluid-container having flexible sidewalls mounted on one of said members in, but not fully occupying, said annular space, the container being so mounted that said sidewalls are unconfined and freely-flexing in service, and means for effecting such movement of one of said members with relation to the other as to bring the said container into and take it out of driving engagement with the member on which it is not mounted.

5. The combination of an industrial service mechanism to be driven and a power transmission therefor comprising a transmission shaft, a member secured thereon and formed with an inwardly facing and at least substantially annular drive surface, a second transmission shaft, and an annular fluid-containing member so mounted on said shaft that said member may roll on said surface in the manner of a pneumatic tire having freely flexing sidewalls, the two said shafts being mounted in series for driving the said mechanism.

6. The combination of an industrial service mechanism to be driven, a pair of transmission shafts in series for driving the same, and, mounted upon them respectively, a driving member and a driven member, one within the other, and, directly embraced by the two, an annular cushioning and torque transmitting element, of high radial deformability and lateral flexibility, so mounted upon one of said members as to run upon a surface of the other member in the manner of a tire.

7. A power transmitting system comprising an industrial service mechanism to be driven, driving and driven power transmission shafts in series for driving the same, a member rotatable with one of said shafts and having an at least substantially annular inner periphery, a member rotatable with the other of said shafts and having an at least substantially annular outer periphery, and a torque transmitting fluid container engageable with and between said peripheries, said container having a portion pressed into driving engagement with one of said peripheries directly by the fluid in said container and also having torque transmitting sidewall portions unconfined to afford free flexing thereof.

8. The combination of a mechanism to be driven, a pair of shafts for driving the same, and, mounted upon them respectively, a driving member and a driven member, one within the other, and, directly embraced by the two, an annular cushioning and torque transmitting element, of high radial deformability and lateral flexibility, so mounted upon one of said members as to run upon a surface of the other member in the manner of a tire, one of the shafts being a motor-shaft, the combination including, as a mounting for the other shaft, a frame wholly supported by the housing of the motor.

9. The combination of a mechanism to be driven, a pair of shafts for driving the same, and, mounted upon them respectively, a driving member and a driven member, one within the other, and, directly embraced by the two, an annular cushioning and torque transmitting element, of high radial deformability and lateral flexibility, so mounted upon one of said members as to run upon a surface of the other member in the manner of a tire, the combination including means for effecting direct-drive connection between the shafts when the torque-transmitting element defined in said claim is out of engagement with the surface on which it runs in the manner of a tire.

THOMAS L. FAWICK.